Feb. 2, 1926. 1,571,517
G. FORNACA
HYDRAULIC BRAKE SYSTEM
Original Filed Feb. 27, 1923  2 Sheets-Sheet 1
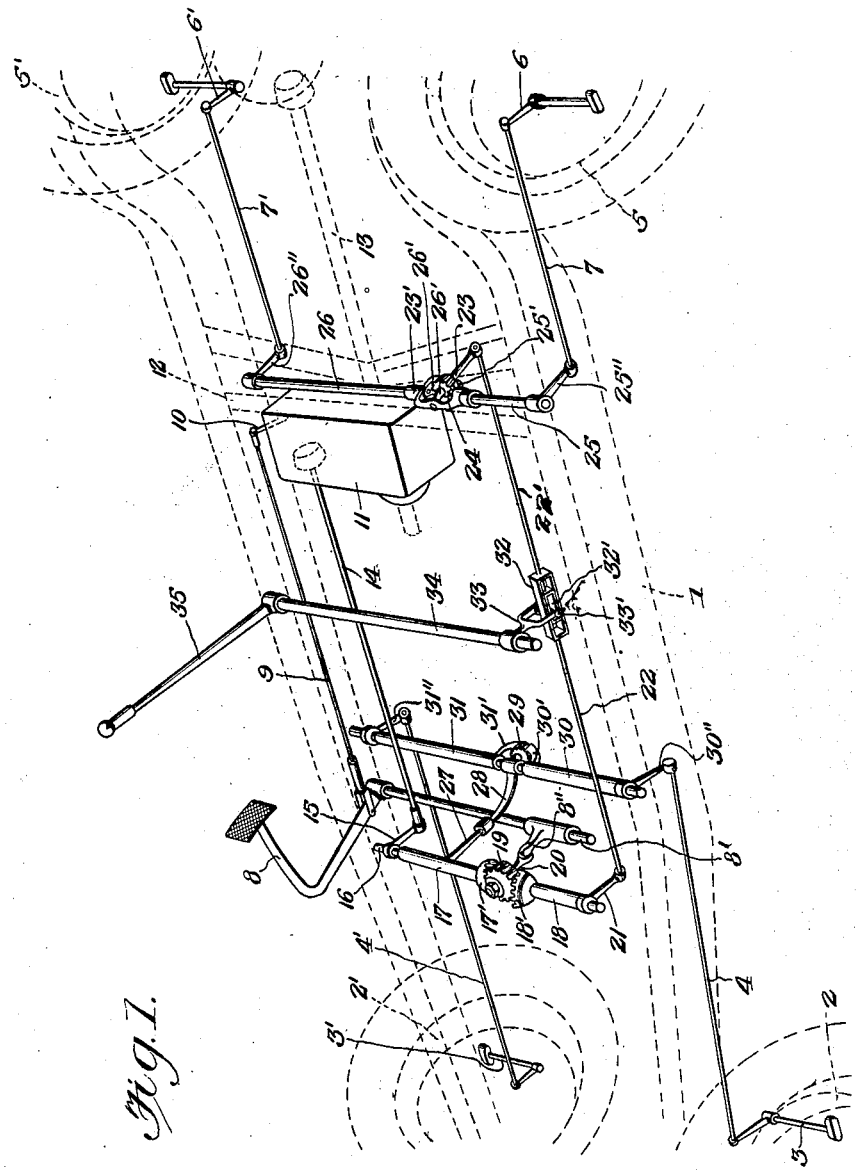
Inventor
Guido Fornaca,
By Emil Bonnelycke
Attorney Feb. 2, 1926.
G. FORNACA
HYDRAULIC BRAKE SYSTEM
Original Filed Feb. 27, 1923    2 Sheets-Sheet 2
1,571,517
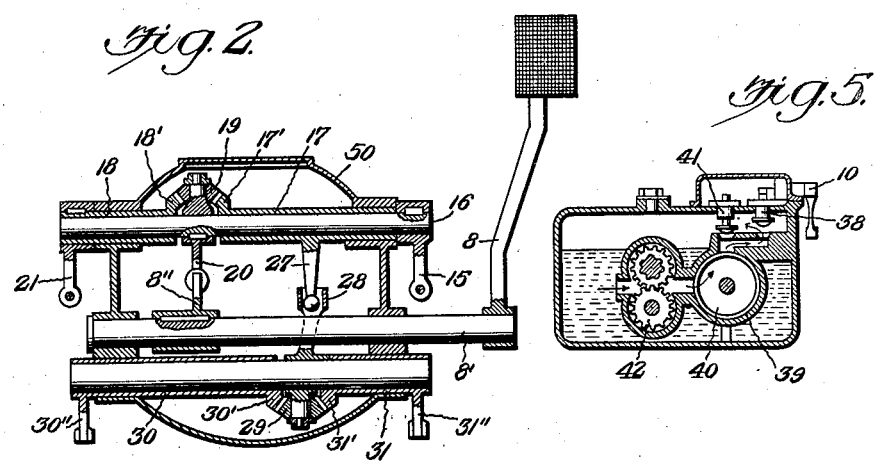
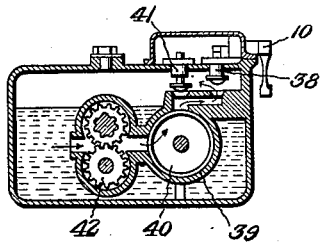
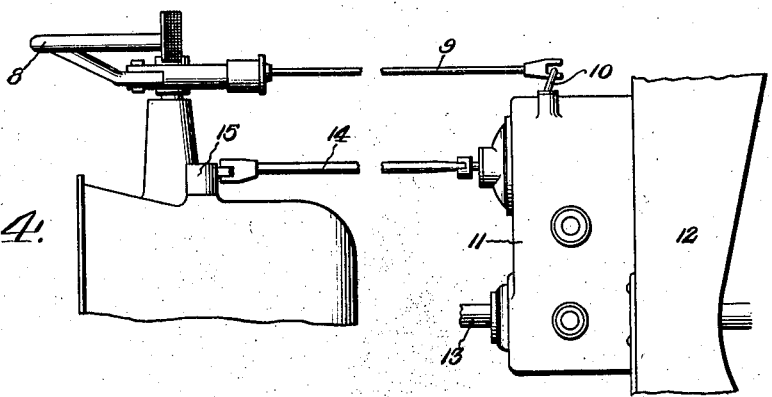
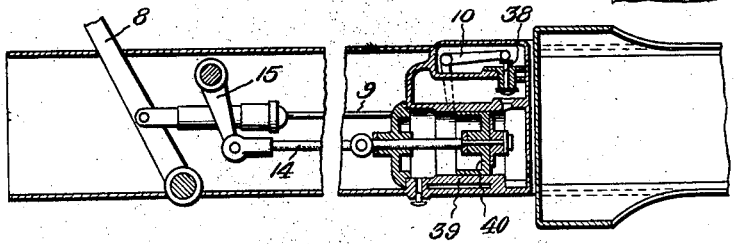
Inventor
Guido Fornaca,
By Emil Bonnelycke
Attorney Patented Feb. 2, 1926.

1,571,517

UNITED STATES PATENT OFFICE.

GUIDO FORNACA, OF TURIN, ITALY.

HYDRAULIC BRAKE SYSTEM.

Original application filed February 27, 1923, Serial No. 621,670. Divided and this application filed March 6, 1924. Serial No. 697,368.

*To all whom it may concern:*

Be it known that I, GUIDO FORNACA, a subject of the King of Italy, residing at 7, via Giannone, Turin, in the Kingdom of Italy, have invented certain new and useful Improvements in Hydraulic Brake Systems, of which the following is a specification.

This invention relates to improvements in hydraulic brake systems for motor vehicles as described in my co-pending application Serial No. 621,670 filed February 27th, 1923, of which the present case is a division. According to the invention a single cylinder is provided for automatically operating all the brakes which are connected together by a system of levers and differential gearings, allowing compensation between the front and rear brake groups and also between the front and rear brakes themselves.

According to the invention means are further provided for completing the action of the hydraulic system by means of the usual hand and pedal operating arrangements, which actuate all or part of the brakes.

The accompanying drawing shows, by way of example, a constructional form of the hydraulic brake system according to this invention.

Figure 1 is a perspective view of the frame of a motor vehicle, on which are mounted the hydraulic brake system and the hand and pedal operating devices.

Figure 2 is a detail view partly in section, showing the countershafts, which are operated either by the piston of the hydraulic device, or by the pedal arrangement.

Figure 3 is a longitudinal elevation of the pedal arrangement for actuating the hydraulic brake, and also shows a section of the hydraulic pressure cylinder.

Figure 4 is a plan view.

Figure 5 is a vertical section of the casing enclosing the pump, the cylinder and the valves.

In Figure 1, 1 denotes the frame of the motor vehicle, 2 and 2' are the drums of the front brakes, 3 and 3' the operating arrangements, and 4 and 4' the rods thereof. The drums of the rear brakes, with their operating arrangements and rods, are denoted by 5 and 5', 6 and 6', 7 and 7', respectively.

The pedal 8 is connected with the resilient rod 9 (described in my co-pending application above identified) which is connected in its turn with the lever 10 for actuating the valve of the hydraulic brake mechanism situated within the casing 11, the latter being secured to the cross bar 12 of the frame.

The piston rod 14 of the hydraulic braking gear projects from the casing 11 and is connected to a lever 15, keyed on to a cross shaft 16, on which are loosely mounted sleeves 17 and 18 having toothed sectors 17' and 18', respectively in gear with a pinion 19 pivotally carried by a lever 20, keyed on the shaft 16.

The sleeve 18 carries a lever 21, connected by a two-part rod with a lever 23 secured to a sleeve 23' and having mounted on it a bevel pinion 24, which gears with toothed sectors 25' and 26', secured to aligned shafts 25 and 26 which carry respectively the levers 25" and 26" and are connected by means of rods 7 and 7' with the operating arrangements 6 and 6' of the rear brakes.

The sleeve 17 carries a lever 27, which engages in the hollow end of a lever 28, the latter together with the bevel pinion 29, serving to operate toothed sectors 30' and 31' attached to the sleeves 30, 31 mounted on a cross shaft and connected by levers 30" and 31" and rods 4, 4' with the operating arrangements 3, 3' for the front brakes.

The differential gearing 19, 17', 18' constitutes a compensating system between the front brakes and the rear brakes, whilst the differential gearings 24, 25', 26' and 29, 30', 31' constitute compensating systems between the two rear brakes and between the two front brakes, respectively.

The pedal 8 is secured to the shaft 8' and acts on the lever 20 through a lever 8" on the shaft.

The two-part rod above-mentioned comprises sections 22 and 22' carrying slides 32 and 32' at their mutually-adjacent inner ends, between which slides engages the pivot 33' of a forked lever 33, connected to the hand-lever 35 through the medium of the cross-shaft 34.

As illustrated in Figure 2, the cross-shafts with their levers are mounted in a box 50 which may be the gear box of the vehicle.

Figure 3 shows besides the members 8, 15, 9, 14, illustrated in the preceding figures, a section of the brake cylinder 39 with the corresponding piston 40 and control valve 38 actuated through the medium of the lever 10 and rod 9 from the pedal 8.

Figure 5 shows the essential parts of the hydraulic operating device, namely the pump 42, cylinder 39, controlling valve 38, safety valve 41 and operating lever 10. The working of this arrangement is described in my co-pending application.

The working of the arrangement illustrated is as follows:

By putting pressure on the pedal 8 the lever 10 is moved to close the valve 38 more or less completely according to the pressure exerted by the foot. Oil is then delivered by the pump 42 into the cylinder 39 and moves the piston 40, thereby moving the rod 14 and turning the shaft 16 by means of the lever 15. The movement of the shaft 16 causes a corresponding movement of the pinion 19, which, in its turn, actuates the lever 21, the two-part rod 22—22' and the lever 23, whilst through its differential gearing it also works the levers 25'' and 26'' connected to the rods 7, 7' of the rear brakes. At the same time the lever 27 is actuated and moves the lever 28 which, acting through its differential gearing 29, 30', 31', moves the levers 30'' and 31'' connected to the front brakes by the rods 4, 4'.

Thus by the single movement of the piston 40 the four brakes are put into operation simultaneously through automatically acting compensating means. The same effect can be obtained independently of the hydraulic arrangement, by increasing the pressure of the foot on the pedal, so as to apply the muscular power of the driver to the brakes and to close the valve 38. The lever 8'' is then pressed against the lever 20, and the bevel pinion 19 operates simultaneously the rear brakes and the front brakes, through the sleeves 17 and 18.

When the two-part rod 22—22' for working the rear brakes is put into action the hand lever 35 does not leave its position of rest for the slide 32, which forms part of the rod, has no influence on the forked lever 33. On the other hand the brakes can be put on by actuating the hand lever when the lever 33, on the front end of the slide, will be pushed forward producing the same effect on the two-part rod as though the rod were operated by the hydraulic arrangement or by the pedal. In this case the braking effect is exerted only on the rear wheels, because the part 32 of the slide allows a forward movement of the part 32' and of the rear member of the two-part rod independently of the front part of the rod, and consequently without the lever 21 being influenced by the action of the hand lever 35.

I claim as my invention:

1. In a four-wheel brake system for motor cars, the combination, with the front and rear wheels and their individual brakes; of hydraulic mechanism embodying a single piston and cylinder only; front and rear transversely-arranged rock shafts; a pair of brake-operating rods connecting each shaft and the corresponding pair of brakes; and connections between the hydraulic mechanism and both shafts for actuating the latter simultaneously from the former, and to which the single piston of said mechanism is operatively related.

2. In a four-wheel brake system for motor cars, the combination, with the front and rear wheels and their individual brakes; of hydraulic mechanism embodying a single piston and cylinder only; a pair of operating rods for each pair of brakes; and a system of compensating members comprising differential mechanisms connecting the hydraulic mechanism with both pairs of rods for actuating the latter simultaneously from the former, and to which the single piston of said mechanism is operatively related.

3. In a four-wheel brake system for motor cars, the combination, with the front and rear wheels and their individual brakes, of hydraulic cylinder-and-piston mechanism, differential operating mechanism individual to the front and rear pairs of brakes, a lever system between the hydraulic mechanism and the two differential mechanisms, means for supplying pressure fluid to the hydraulic mechanism, a valve for controlling the fluid supply, a pedal for operating said valve, and a hand lever operatively associated with said lever system for actuating the same to apply the rear brakes independently of the hydraulic mechanism and to the exclusion of the front brakes; substantially as described.

4. A four-wheel brake system according to claim 3, in which the connections between the hand lever and the lever system include a lost-motion device which permits the lever system to be operated by the hydraulic mechanism while the hand lever remains stationary; substantially as described.

5. In a four-wheel brake system for motor cars, the combination, with the front and rear wheels and their individual brakes, of front and rear differential operating mechanisms connected with the front and rear pairs of brakes, hydraulic cylinder-and-piston mechanism, a differential mechanism separate from the two first-named differential mechanisms but connected to operate both of them, and means for automatically operating the last-named differential mechanism from the hydraulic mechanism; substantially as described.

6. In a four-wheel brake system for motor cars, the combination, with the front and rear wheels and their individual brakes, of front and rear differential operating mechanisms connected with the front and rear pairs of brakes, hydraulic cylinder-and-piston mechanism, a differential mechanism separate from the two first-named differential mechanisms but connected to operate both of them, and a pedal for operating the last-named differential mechanism either directly or indirectly, and automatically through the hydraulic mechanism; substantially as described.

7. In a four-wheel brake system for motor cars, the combination, with the front and rear wheels and their individual brakes, of front and rear differential operating mechanisms connected with the front and rear pairs of brakes, hydraulic cylinder-and-piston mechanism, a differential mechanism separate from the two first-named differential mechanisms but connected to operate both of them, means for automatically operating the last-named differential mechanism from the hydraulic mechanism, and manual means for operating the rear differential mechanism independently of said last-named differential mechanism, and to the exclusion of the front differential mechanism; substantially as described.

8. In a four-wheel brake system for motor cars, the combination, with the front and rear wheels and their individual brakes, of front and rear differential operating mechanisms connected with the front and rear pairs of brakes, hydraulic cylinder-and-piston mechanism, a differential mechanism separate from the two first-named differential mechanisms but connected to operate both of them, a pedal for operating the last-named differential mechanism either directly or indirectly and automatically through the hydraulic mechanism, and a lever for manually operating the rear differential mechanism independently of the pedal and to the exclusion of the front differential mechanism; substantially as described.

9. In a four-wheel brake system for motor cars, the combination, with the front and rear wheels and their individual brakes, of front and rear differential operating mechanisms connected with the front and rear pairs of brakes, hydraulic cylinder-and-piston mechanism, a differential mechanism separate from the two first-named differential mechanisms but connected to operate both of them, means for operating the last-named differential mechanism either directly or indirectly and automatically through the hydraulic mechanism, and means for operating one of the two first-named differential mechanisms independently of the hydraulic mechanism and to the exclusion of the other first-named differential mechanism; substantially as described.

10. In a four-wheel brake system for motor cars, the combination, with the front and rear wheels and their individual brakes, of front and rear differential operating mechanisms for the corresponding pairs of brakes, a third differential mechanism separate from the first two differential mechanisms but connected to operate both of them, and a single fluid-operated piston connected to directly operate the third differential mechanism; substantially as described.

11. In a four-wheel brake system for motor cars, the combination, with the front and rear wheels and their individual brakes, of front and rear differential operating mechanisms for the corresponding pairs of brakes, a third differential mechanism separate from the first two differential mechanisms but connected to operate both of them, a single fluid-operated piston connected to directly operate the third differential mechanism, a valve for controlling the supply of motive fluid to said piston, and a pedal for opening said valve to actuate the piston or for directly operating the third differential mechanism; substantially as described.

12. In a four-wheel brake system for motor cars, the combination, with the front and rear wheels and their individual brakes, of front and rear differential operating mechanisms for the corresponding pairs of brakes, a third differential mechanism separate from the first two differential mechanisms but connected to operate both of them, a single fluid-operated piston connected to directly operate the third differential mechanism, and manual means for operating the rear differential mechanism independently of the third differential mechanism and to the exclusion of the front differential mechanism; substantially as described.

13. In a four-wheel brake system for motor cars, the combination, with the front and rear wheels and their individual brakes, of front and rear differential operating mechanisms for the corresponding pairs of brakes, a third differential mechanism separate from the first two differential mechanisms but connected to operate both of them, a single fluid-operated piston connected to directly operate the third differential mechanism, a valve for controlling the supply of motive fluid to said piston, a pedal for opening said valve to actuate the piston, or for directly operating the third differential mechanism, and manual means for operating the rear differential mechanism independently of the pedal and to the exclusion of the front differential mechanism; substantially as described.

14. In a four-wheel brake system for motor cars, the combination, with the front and rear wheels and their brakes, of hydraulic cylinder-and-piston mechanism, connections between said mechanism and all of the brakes to actuate them simultaneously, a valve for controlling the supply of motive fluid to the hydraulic mechanism, a pedal connected to open said valve and operate the hydraulic mechanism or to directly operate said brake-actuating connections, and a manual device operatively related to the connections leading to the rear brakes to set the latter independently of the pedal and to the exclusion of the front brakes; substantially as described.

15. In a four-wheel brake system for motor cars, the combination, with the front and rear wheels and their brakes, of hydraulic cylinder-and-piston mechanism, connections between said mechanism and all of the brakes to actuate them simultaneously, a valve for controlling the supply of motive fluid to the hydraulic mechanism, a pedal connected to open said valve and operate the hydraulic mechanism or to directly operate said brake-actuating connections, and a hand lever having a lost-motion connection with the actuating connections leading to the rear brakes to set the latter independently of the pedal and to the exclusion of the front brakes and to enable said pedal to be shifted while the lever remains stationary; substantially as described.

In testimony whereof I affix my signature.

GUIDO FORNACA.